United States Patent [19]

Witte

[11] Patent Number: 4,844,778
[45] Date of Patent: Jul. 4, 1989

[54] MEMBRANE WITH PERFORATIONS, METHOD FOR PRODUCING SUCH A MEMBRANE AND SEPARATING DEVICE COMPRISING ONE OR MORE OF SUCH MEMBRANES

[75] Inventor: Johan F. Witte, Amsterdam, Netherlands

[73] Assignee: Stork Veco B.V., Netherlands

[21] Appl. No.: 135,343

[22] Filed: Dec. 21, 1987

[30] Foreign Application Priority Data

Dec. 23, 1986 [NL] Netherlands ............... 8603278

[51] Int. Cl.$^4$ ............................................. C25D 1/078
[52] U.S. Cl. ........................................................ 204/11
[58] Field of Search ............................................ 204/11

[56] References Cited

U.S. PATENT DOCUMENTS

| | | | |
|---|---|---|---|
| 3,402,110 | 9/1968 | Scherrer | 204/11 |
| 3,498,891 | 3/1970 | Futterer | 204/11 |
| 4,496,434 | 1/1985 | Morssinkhof | 204/11 |
| 4,575,406 | 3/1986 | Slafer | 204/11 |

FOREIGN PATENT DOCUMENTS

| | | |
|---|---|---|
| 0007447 | 2/1980 | European Pat. Off. . |
| 0110463 | 6/1984 | European Pat. Off. . |
| 0213902 | 3/1987 | European Pat. Off. . |
| 1202610 | 10/1965 | Fed. Rep. of Germany . |

Primary Examiner—T. M. Tufariello
Attorney, Agent, or Firm—Ostrolenk, Faber, Gerb & Soffen

[57] ABSTRACT

Described is a membrane and its method of manufacturing which membrane is an electroformed metal foil having areas of high perforation density (higher than 150000/cm$^2$) and unperforated areas and in particular also unperforated areas having greater thickness than the other areas.

The membrane is produced in a process comprising a two step photolithographic procedure in which canals formed in the first photolithographic step are used to ensure good vacuum contact during the second photolitographic step in which the high density pattern is formed in the photolacquer used.

The invention also relates to a separation device incorporating one or more membranes according to the invention.

20 Claims, 4 Drawing Sheets

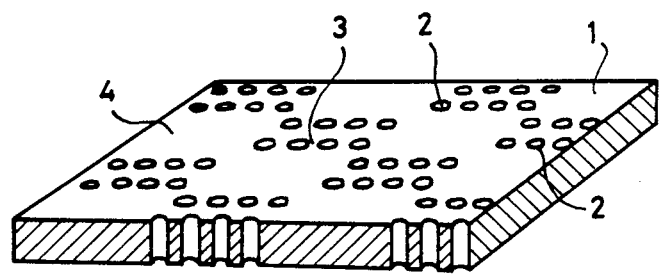
FIG:2a.
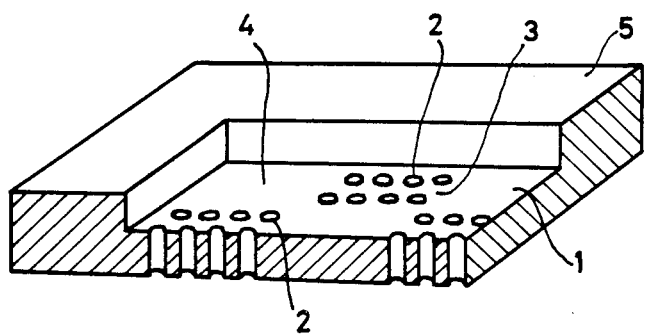
FIG:2b.

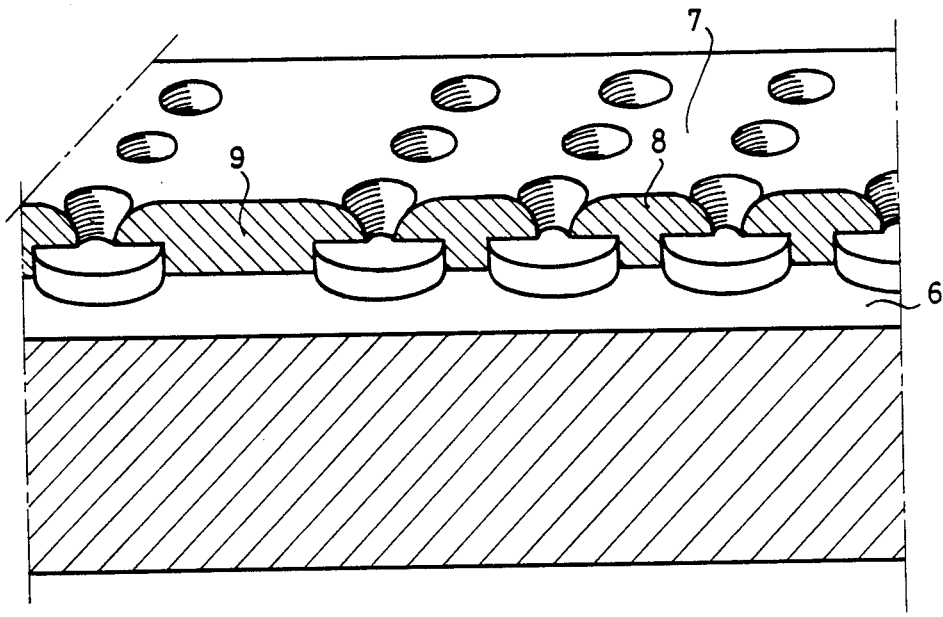
FIG: 2a.
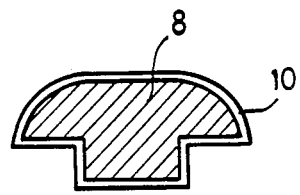
FIG: 2b.

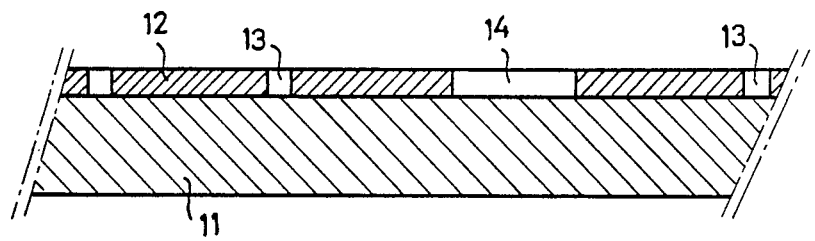
_FIG:3a._
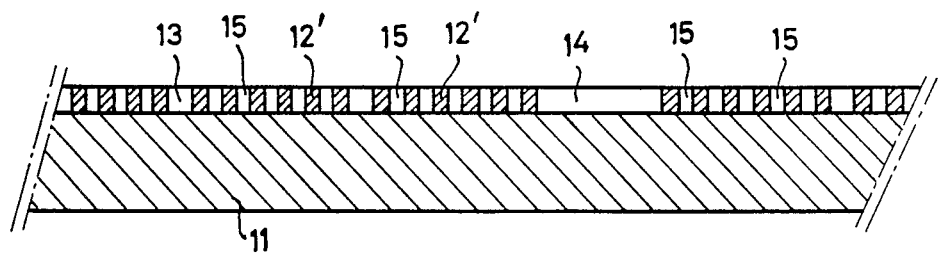
_FIG:3b._
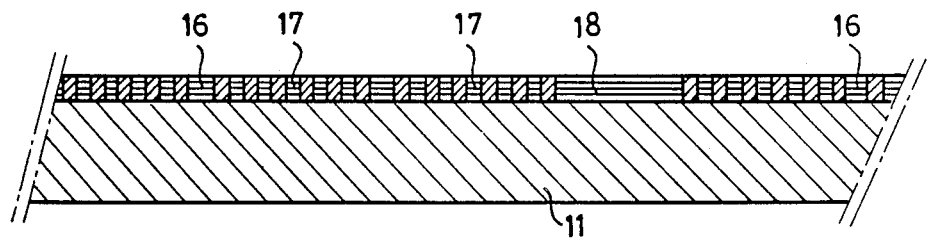
_FIG:3c._

MEMBRANE WITH PERFORATIONS, METHOD FOR PRODUCING SUCH A MEMBRANE AND SEPARATING DEVICE COMPRISING ONE OR MORE OF SUCH MEMBRANES

FIELD OF THE INVENTION

The invention relates to a membrane for separating media containing several constituents consisting of a foil having perforations wherein the membrane consists entirely of metal and is produced by electroforming, and the perforations are arranged in accordance with a predetermined regular pattern, the perforation density being at least 150000/cm$^2$.

From EP-A$_2$-0 213 902 a microsieve is known having abovementioned characteristics.

Said microsieve has an increased thickness in order to improve resistance to mechanical distortion and is further formed integrally with a rigid frame. The surface area of such microsieve is indicated as being circular with a diameter of 3000 microns, which is about a surface area of 0.07 cm$^2$, corresponding to the aperture of said rigid frame.

Such known sieves, although in terms of fineness comparable to the membrane of the present invention, are not practically usable as membranes because of their small surface area.

SUMMARY OF THE INVENTION

The present invention has as an object to provide a membrane of the type indicated which has a surface area which is sufficiently large to be used for separating all types of media into components, for example for use in separating solids and liquids, separating gas mixtures and the like. Of the applications, mention may also be made, for example, of the desalination of seawater, blood dialysis for the benefit of kidney patients and industrial separation processes.

Said object is attained with a membrane of the present invention which membrane consists entirely of metal and is produced by electroforming, and the perforations are arranged in accordance with a predetermined regular pattern, the perforation density being at least 150000 perforations/cm$^2$ wherein said membrane has a plurality of regions with a desired perforation density while the remaining area is occupied by unperforated regions.

By providing a pattern of insulation areas on an electrically conducting mandrel and connecting said mandrel in an electroplating bath in a manner such that a metal deposit is formed on the mandrel a material can be manufactured which has a regular pattern of perforations which are arranged in a predetermined regular pattern and in which case the perforation density can be at least 150000 perforations/cm$^2$ without considerable problems. As a consequence of using an electroplating method, the size of the perforations can be in this case be very small and even approach zero.

Starting from a particular size of the insulating areas on the mandrel, the final perforation diameter can be adjusted as small as desired by overgrowth of metal over said insulating areas in the electroplating operation.

In particular in the membrane according to the invention, the unperforated regions have at least partially a greater thickness than the regions in which the perforation density has the desired value. Such a membrane having unperforated regions of greater thickness is sufficiently rigid to be self-bearing.

Advantageously, such a membrane is produced from nickel, although other metals such as copper, iron and chromium can also be used. As regards strength, however, nickel is an advantageous metal for the membrane.

In relation to corrosion resistance, it is advisable in certain cases to provide the membrane on its outside surface with a corrosion- and/or wear-resistant coating, it being possible for such coatings to be produced from materials such as chromium, cobalt/nickel, tin/nickel, titanium nitride, B/nickel, P/nickel, silicon carbide, silicon dioxide, noble metals and the like. To provide such corrosion- and/or wear-resistant coatings, recourse may be made to electroplating methods, while vacuum methods such as cathode spattering, vapour deposition and ion implantation may also be used. Chemical metal deposition methods may also be used.

The invention is also embodied in a method for producing a membrane such as has been described above according to the invention. Such a method is characterized in that, in a first step, a photoresist pattern, the resist-regions of which correspond to the unperforated regions to be distinguished in the finished membrane, is formed on an electrically conducting substrate by coating with photoresist, exposure using a suitable film and development; in that a subsequent exposure and development is then carried out using a mask suitable for the purpose and, making use of a vacuum contact and a suitable light source, wherein a pattern is formed in the photoresist regions left behind after the first step, the uncoated areas in said pattern corresponding to the metal between the perforations in the perforation regions of the finished membrane; in that the substrate thus provided with a composite photoresist pattern is subjected to an electroplating operation for depositing metal on all the uncoated regions; and in that the metal deposit thus formed is removed.

As described above, the forming of the photoresist pattern needed in the electroplating operation takes place in two phases:

In a first step a pattern, the resist-free regions of which correspond to the regions in the subsequent finished membrane which contain no perforations is formed (assuming, for example, a positive working photoresist) on a substrate. Such resist-free regions are present in at least two types, as will be explained later with the aid of the figures. A first type is situated around small regions in which perforations are situated. The second type always encompasses a relatively large region in which a large number of separate regions containing perforations are situated. As a result of the presence of the resist-free regions, a large number of small canals which have a depth which is equal to the original thickness of the photoresist layer is formed in the previously continuous photoresist layer. If a mask suitable for the process which contains the information corresponding to the size of the perforation is now brought into contact with said photoresist surface provided with canals in a second exposure process, a vacuum being applied between the mask and the substrate on which the photoresist pattern is situated, a very good contact between the mask and the remaining photoresist surface will be achieved by the presence of the small channels. On exposure and subsequent development, a very precise copy, which corresponds to the information present in the mask, will be obtained for the perforation regions.

If the substrate with the photoresist pattern formed thereon and produced in two steps is then subjected to an electroplating operation, as a result of which metal deposits on the uncoated areas in the resist pattern, a very precisely defined metal deposit will be obtained with perforations accurately defined as regards arrangement and size.

Attention is further drawn to the fact that in the method described above, a still better sharpness of detail is obtained if either the substrate or the mask used is flexible. In the exposure steps, an extremely good contact will then be brought about between mask and photoresist surface. Moreover, the method will be considerably influenced by the surface roughness of the substrate used; as small roughness as possible yields the greatest precision. A roughness $R_a$ of 0.005–0.006 μm, makes it possible to achieve details with a precision of ±0.03 μm; perforations with a diameter of 0.1 μm can consequently be achieved in a reproduceable manner.

The metal deposit produced in this manner can be removed, as a result of which a membrane is obtained. Such a membrane, if necessary provided with a support, can be employed immediately in separation processes, the perforation size and the perforation density being decisive for the field of application.

As regards fields of application there are broadly three fields to be distinguished which are specified in the table below;

TABLE

| | Field | Hole size | Separation of | Into |
|---|---|---|---|---|
| 1. | Microfiltration (uF) | 0.1–10 μm | Liquid and low-molecular compounds | Large colloidal particles and microorganisms |
| 2. | Ultrafiltration (UF) | 0.005–0.5 μm | Liquid and low-molecular compounds | As above plus macro-molecule compounds |
| 3. | Hyperfiltration (HF) | 0.0005–0.05 μm | Liquid and ions | As above plus microorganisms |

Insofar as can now be assessed, the membranes described in the present application will find their application in microfiltration and ultrafiltration applications. In view of the production method described above, however, hyperfiltration applications are not ruled out. Important advantages of the membranes described above and formed essentially of metal may be summarized as follows:

1. Temperature resistance up to approx. 200° C.;
2. High mechanical strength, as a result of which high pressure loading is possible;
3. Usable in a wide range of pH;
4. As a result of the conductivity of the material, electrochemical cleaning methods which are extremely effective are possible;
5. A long service life as a result of high mechanical strength;
6. High achievable transmission percentages with very low perforation size and high density;
7. Less spread in hole size as a result of completely controlled and predictable production process;
8. Better definition of the hole geometry;
9. The shape of the perforations can be influenced in an important manner by the electroplating method;
10. Because the material consists of metal, it is possible to repair leaks;
11. Bacteriological attack plays no or only a very small role.

The method described above for producing a membrane according to the invention can very advantageously be further extended by providing, prior to removing the membrane in the form of the metal deposit, a new photoresist layer on top of the photoresist pattern and the formed metal deposit which is exposed in a manner such that, after development, at least a part of the unperforated regions of the metal deposit is uncoated, after which said regions are coated with a relatively thick metal layer in an additional electroplating operation.

Said additional electroplating operation has to object of providing a reinforcing metal layer on the unperforated regions present in the membrane, as a result of which the total strength of the membrane is very beneficially affected and as a result of which the membrane acquires a self-supporting nature. Such reinforcing layers are, for example, provided around the regions containing regions having a desired perforation density.

In the methods described above, several electrically conducting substrates may be advantageously mounted on an electrically conducting parent body during the various electroplating operations.

It is also possible, of course, to use a very large conducting substrate which is provided in its entirety with photoresist, a large number of photoresist patterns arranged in one pattern, each having the size of the maximum format to be achieved in such methods, being formed by carrying out the first-stage and second-stage exposure in a mass production manner. By carrying out the operation in a manner such that the parts of the substrate present between the photoresist pattern are resist-free the result is achieved in the electroplating operation that the metal deposits corresponding to each of the separate photoresist patterns are joined to each other by metal.

The reinforcement operation described above and optionally used can be carried out in the same manner for said assembly of membranes. It may serve as an indication that, according to the present invention, a reinforced membrane having a surface area in the order of approximately 80 cm$^2$ can be produced so that, if a larger membrane surface area is desired, either a large number of said membranes should be mounted or a large number of membranes joined to each other by metal having such a surface area should be produced at once by means of the method described above. Of course, with the advance of technology or with the application of advanced technology already known at present, the forming of metal membranes with an appreciably larger surface area than the 80 cm$^2$ described above may be expected.

In principle, the method described above can be carried out with substrates which may be both cylindrical and flat. To achieve the highest accuracy, however, preference is given to employing flat conducting substrates.

The invention is finally embodied in a device for separating a medium containing several constituents comprising at least a housing, medium feeding and withdrawal means and means for mounting one or more membranes wherein the membrane(s) used is (are) (a) membrane(s) as described according to the present invention.

BRIEF DESCRIPTION OF THE DRAWING

The invention will now be explained by means of the accompanying drawing in which:

FIGS. 1a and 1b show a diagrammatic perspective view of a part of a membrane according to the invention.

FIG. 2a shows a diagrammatic prespective view on an enlarged scale of another membrane according to the invention while it is situated on the mandrel.

FIG. 2b shows a diagrammatic section through a bar of a membrane according to the invention.

FIGS. 3a–f show a diagrammatic representation, in section, of substrate, photoresist and/or metal deposited by electroplating upon carrying out the various steps in the method for forming a membrane according to the invention.

In FIG. 1a, a metal membrane is indicated by general reference numeral 1 and the perforations contained in the membrane by 2. The perforations 2 are accommodated in regions 3 having a desired perforation density, while unperforated regions 4 are situated between said regions. The parts of the membrane shown here are drawn diagrammatically; i.e. dimensions and relations are not in accordance with reality.

In FIG. 1b, the same situation is sketched as in FIG. 1a; here, however, a number of regions with desired perforation density 3 and unperforated regions 4 are surrounded by unperforated regions 5 which have a greater thickness than the regions 3 and 4. To define the idea, 2.5 to 10 $\mu$m may be taken for the thickness of the regions 3 and 4, while the region 5 may in that case be 50 to 100 $\mu$m thick. In the drawing, the perforations are shown as cylindrical. The sketched cylinder form means that, in the case of the membrane in FIGS. 1a and 1b, the thickness of the metal deposited on the mandrel by electroplating is less than or at most equal to the thickness of the photoresist pattern on the metal mandrel, that is in the regions in which the assemblies of perforations are situated and also regions which are situated in between (3, 4).

FIG. 2a shows a mandrel 6 with a pattern of photoresist areas 7 situated thereon. The mould 6 is of metal and is placed in an electrolytic bath as cathode in order to be provided with a metal deposit such as, for example, a copper, nickel or iron deposit. Depending on the mutual distance between the photoresist areas 7, metal regions 8 and 9 are formed in which the regions 8 are situated in the regions with desired perforation density (indicated by 3 in FIG. 1a) and the regions 9 correspond to unperforated regions (indicated by 4 in FIG. 1a); the dimensions and proportions have, of course, been modified for reasons of clarity and do not correspond with reality.

In FIG. 2a it is evident that in this case (in contrast to that in FIGS. 1a, b) the thickness of the deposited metal layer (8, 9) is greater than the thickness of the parts (7) of the resist pattern so that both inter growth and over growth of the resist pattern is involved.

FIG. 2b shows a bar 8 in FIG. 2a yet again in section; 10 indicates that the bar 8 is provided with a wear- and/or corrosion resistant enveloping layer 10. As regards the dimensions, the following applies:

The total bar height is; 7 $\mu$m
Thickness of resist copy on mandrel: 3.5 $\mu$m
Over growth of resist; 3.5 $\mu$m
Layer thickness of layer 10; 0.2 $\mu$m FIGS. 3a–f show diagrammatically the manner in which a membrane according to the invention is formed. In FIG. 3a, a substrate 11 is provided in a known manner with a photoresist pattern having resist parts 12 and resist-free parts 13 and 14; the resist pattern described here is formed by means of a positive working resist.

Figure 3D:
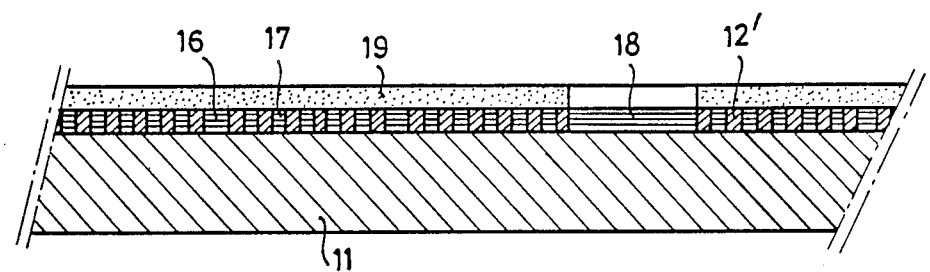

The resist pattern formed on the substrate is then brought in register into contact with a film which has, at the position of the regions 12, a light transmitting network, the fineness of which is equal to the fineness of the perforation pattern which is desired at the position of the regions 12. As a result of the presence of resist-free parts 13 and 14 (which have the form of channels which are in communication with each other), an excellent contact between film and resist pattern is ensured when they are brought into contact by means of vacuum. After exposure by means of suitable radiation and development, the region 12 has become an array of resist areas 12' which are surrounded by resist-free areas 15 which again have the channel form (FIG. 3b). By incorporating the substrate which has been provided with a photoresist pattern in two steps, in an electroplating bath (for example a nickel or copper bath) as cathode, the result can be achieved that metal (for example Ni or Cu) deposits on the regions 13, 14, 15 in the form of metal sections 16, 18 and 17 respectively (FIG. 3c).

The drawing (FIG. 3c) indicates that the metal growth takes place exclusively between the photoresist bars 12'. The perforation size is then determined by the size of said resist parts 12'. If a smaller perforation size is desired than corresponds to the size between the resist parts 12', this may, of course, be achieved by continuing to deposit metal by electroplating after the metal deposit has reached a thickness which is equal to the height of parts 12'. The metal will then start to grow over the resist parts 12' in the horizontal direction (i.e. parallel to the substrate) as well as in the vertical direction, as a result of which the final perforation size becomes smaller. After the state described in FIG. 3c has been reached, the resist can be removed, as a result of which a perforated metal foil is obtained with perforations corresponding to the dimensions between resist parts 12' or smaller.

Figure 3E:
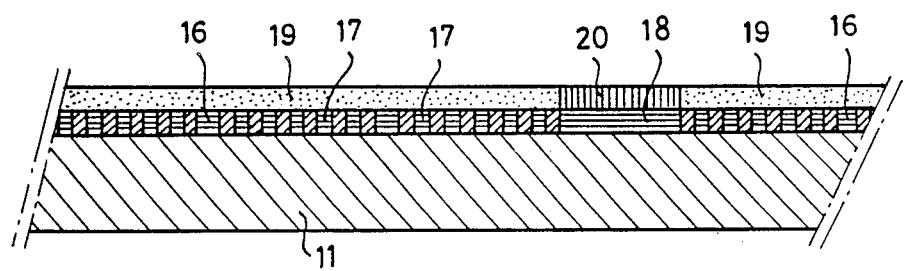
Figure 3F:
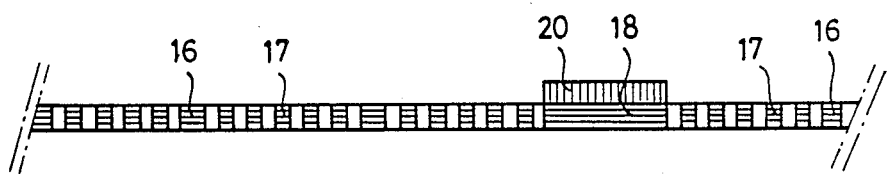

To carry out the process, the substrate is expediently provided with a separating layer such as, for example, a chromium layer; as a result of this, the metal deposit formed can easily be removed from the substrate either before or after resist removal. Using supporting means, the perforated metal foil obtained can immediately be used as a separating membrane. FIGS. 3d–f show that, by means of the method of the invention, self-supporting membranes may also be obtained. FIG. 3d shows that the entire surface of deposit metal (16 and 17) and resist (12') is coated with a resist layer 19 while the metal deposit 18 is left uncoated. A new metal layer 20 is then deposited adhesively in an electroplating bath on metal layer 18 (FIG. 3e). In FIG. 3f the removed metal deposit, which corresponds to the deposit in FIG. 3c, but with the thickness of the parts 18 being increased by layer 20, can be seen (after lacquer removal). As a result of this measure, a membrane is obtained which is self-supporting as a result of the combined thickness of metal layers 18 and 20. Of course, in this case, too, the height of the metal layer 20 can be less than or equal to the thickness of the layer 19, but also greater.

What is claimed is:

1. Membrane for separating media containing several constituents which is a foil having a plurality of symmetrically shaped perforations, said foil consisting entirely of electroformed metal of uniform thickness, the perforations being arranged in a predetermined regular pattern forming a plurality of regions each having all the same desired perforation density, the perforation density being at least 150,000 perforations/cm², and in which the remaining regions of the foil includes an unperforated area between at least two perforation regions.

2. Membrane according to claim 1, wherein the unperforated regions of said membrane carry electroformed metal thereby to cause such unperforated regions to have a greater thickness than the regions in which the perforation density has the desired value.

3. Membrane according to claim 1, wherein said membrane consists essentially of nickel.

4. Membrane according to claim 1, wherein said membrane further comprises on its outside surface, a corrosion or wear-resistant coating.

5. Membrane according to claim 4, wherein the coating is selected from the group consisting of as chromium, cobalt/nickel, B-nickel, P-nickel, tin-nickel, titanium nitride, silicon carbide, silicon dioxide, noble metals and alloys thereof.

6. Membrane according to claim 1, wherein said membrane has a surface area exceeding 0.07 cm².

7. Method for producing a membrane having a perforation density in a plurality of predetermined areas of at least 150000/cm²,
wherein, in a first step, a photoresist pattern, the resist-free regions of which correspond to the unperforated regions to be present in the finished membrane, is formed on an electrically conducting substrate by coating with photo-resist, exposure using a suitable film and development;
wherein a subsequent exposure and development is then carried out using a mask suitable for the purpose and, making use of vacuum contact and a suitable light source, whereby a pattern is formed in the photoresist regions left behind after the first step, the uncoated areas in said pattern corresponding to the metal between the perforations in the regions of the finished membrane where the perforation density has the desired value;
wherein the substrate thus provided with a composite photoresist pattern is subjected to an electroplating operation for depositing metal on all the uncoated regions; and wherein the metal deposit thus formed is removed.

8. Method according to claim 7, wherein, prior to the removal of the metal deposit formed, a new photoresist layer is provided on top of the photoresist pattern and formed metal deposit, which is exposed in a manner such that, after development, at least a part of the unperforated regions of the metal deposit is uncoated, after which said regions are coated with a relatively thick metal layer in an additional electroplating operation.

9. Method according to claim 7, wherein the formed metal deposit is provided with a corrosion-or wear-resistant coating which is selected from the group consisting of chromium, cobalt/nickel, B-nickel, P-nickel, tin-nickel, titanium nitride, silicon carbide, silicon dioxide, noble metals and alloys of noble metals.

10. Method according to claim 7, wherein several electrically conducting substrates is mounted on an electrically conducting parent body during the various electroplating operations.

11. Method according to claim 10, wherein the electrically conducting substrates and the electrically conducting parent body are flat.

12. Device for separation of a medium containing several constituents comprising at least a housing, medium feeding and withdrawal means and means for mounting at least one membrane and a mounted membrane according to claim 1.

13. Device for separation of a medium containing several constituents comprising at least a housing, medium feeding and withdrawal means and means for mounting at least one membrane and a mounted membrane according to claim 2.

14. Device for separation of a medium containing several constituents comprising at least a housing, medium feeding and withdrawal means and means for mounting at least one membrane and a mounted membrane according to claim 3.

15. Device for separation of a medium containing several constituents comprising at least a housing, medium feeding and withdrawal means and means for mounting at least one membrane and a mounted membrane according to 1 wherein the unperforated regions of said membrane carry electroformed metal thereby to cause such unperforated regions to have a greater thickness than the regions in which the perforation density has the desired value and in which the foil has a thickness which is insufficient to make the membrane self-supporting and the thickness of the electroformed metal on the unperforated regions is sufficient to make the resulting membrane self-supporting.

16. Device for separation of a medium containing several constituents comprising at least a housing, medium feeding and withdrawal means and means for mounting at least one membrane and a mounted membrane according to claim 1 wherein the unperforated regions of said membrane carry electroformed metal thereby to cause such unperforated regions to have a greater thickness than the regions in which the perforation density has the desired value and in which the foil has a thickness which is insufficient to make the membrane self-supporting and the thickness of the electroformed metal on the unperforated regions is sufficient to make the resulting membrane self-supporting and in which said foil is a nickel foil and in which said membrane further comprises on its outside surface, a corrosion or wear-resistant coating.

17. Membrane according to claim 2 in which the foil has a thickness which is insufficient to make the membrane self-supporting and the thickness of the electroformed metal on the unperforated regions is sufficient to make the resulting membrane self-supporting.

18. Membrane according to claim 17 in which said foil is a nickel foil.

19. Membrane according to claim 18 wherein said membrane further comprises on its outside surface, a corrosion or wear-resistant coating.

20. Method according to claim 10, wherein the electrically conducting substrates and the electrically conductive parent body are cylindrical.

* * * * *